US012790523B2

(12) United States Patent
Dupont et al.

(10) Patent No.: US 12,790,523 B2
(45) Date of Patent: Nov. 10, 2026

(54) ADHESIVE COMPOSITION AND METHODS OF PREPARATION THEREOF

(71) Applicant: Kraton Corporation, Houston, TX (US)

(72) Inventors: Martine Dupont, Amsterdam (NL); Suyata Dwarka, Almere (NL); Peter Migchels, Brussels (BE)

(73) Assignee: Kraton Corporation, The Woodlands, TX (US)

( * ) Notice: Subject to any disclaimer, the term of this patent is extended or adjusted under 35 U.S.C. 154(b) by 727 days.

(21) Appl. No.: 18/194,824

(22) Filed: Apr. 3, 2023

(65) Prior Publication Data

US 2023/0313000 A1 Oct. 5, 2023

Related U.S. Application Data

(60) Provisional application No. 63/362,468, filed on Apr. 5, 2022.

(51) Int. Cl.
*C09J 11/08* (2006.01)
*C09J 123/02* (2006.01)
*C09J 153/02* (2006.01)

(52) U.S. Cl.
CPC ........... *C09J 153/025* (2013.01); *C09J 11/08* (2013.01); *C09J 123/02* (2013.01); *C09J 2203/358* (2020.08); *C09J 2301/312* (2020.08); *C09J 2301/408* (2020.08)

(58) Field of Classification Search
CPC ...... C09J 153/025; C09J 11/08; C09J 123/02; C09J 2203/358; C09J 2301/312; C09J 2301/408; C09J 123/14; C09J 157/02
See application file for complete search history.

(56) References Cited

FOREIGN PATENT DOCUMENTS

| | | | |
|---|---|---|---|
| EP | 1331258 | * | 7/2003 |
| EP | 1331258 | A1 | 7/2003 |
| WO | 2016132704 | A1 | 8/2016 |
| WO | WO2016/132704 | * | 8/2016 |
| WO | 2019126982 | A1 | 7/2019 |
| WO | WO2019/126982 | * | 7/2019 |

* cited by examiner

*Primary Examiner* — Kumar R Bhushan

(57) ABSTRACT

The disclosure relates to an adhesive composition comprising a partially hydrogenated styrenic block copolymer (p-HSBC) and an amorphous polyolefin (APO) having a density of less than 1 g/cm$^3$ and a softening point of 10-120° C. The composition has desirable elastomeric properties as well as beneficial processability characteristics. The unique combination of processability and performance attributes results in the adhesive compositions useful in a variety of applications such as disposable nonwoven hygienic articles, paper converting, flexible packaging, woodworking, carton, case sealing, and other assembly applications.

21 Claims, No Drawings

ADHESIVE COMPOSITION AND METHODS OF PREPARATION THEREOF

RELATED APPLICATIONS

This application claims priority from U.S. Provisional Application No. 63/362,468 with a filing date of Apr. 6, 2022, the disclosure of which is incorporated herein by reference.

FIELD

The present disclosure relates to an adhesive composition comprising partially hydrogenated styrenic block copolymer (p-HSBC) and amorphous polyolefin, methods of preparation, and applications thereof.

BACKGROUND

Adhesives are often used to hold materials together in a functional manner by a surface attachment that resists separation. In industrial adhesive applications, hot melt adhesives are commonly used to bond together a wide variety of articles including disposable absorbent articles comprising non-woven substrates e.g., adult incontinence products, disposable diapers, sanitary napkins, bed pads, puppy pads, medical dressings, etc.

Hot-melt adhesives developed for these applications require easy processibility, e.g., showing low and stable hot-melt viscosities. They are also expected to exhibit high mechanical performance to conform to body movements and hold the increased volume of the absorbent material. It is also preferable to have low color and odor.

Most common adhesives can be based on polymers such as polyolefins (ethylene or propylene-based polymers) or styrenic block copolymers. Polyolefin-based formulations are typically oil-free, providing the required hot-melt stability and processability. However, polyolefin-based formulations lack mechanical and adhesion performance. Styrene-isoprene-styrene (SIS) or styrene-butadiene-styrene (SBS) based adhesive formulations may provide the required adhesive and mechanical properties, but as the adhesives contain relatively high amounts of mineral oil, odor can be developed.

There is a need to develop adhesive compositions for different substrates with improved properties, e.g., high elongation rates, good stability, low to negligible odor, easy processability, and adhesion performance.

SUMMARY

In one aspect, the disclosure relates to an adhesive composition comprising or consisting essentially of or consisting of, 20 to 40 wt. % of an amorphous polyolefin having a density of less than 1 g/cm3, a glass transition temperature of less than −50° C., a softening point of 10-120° C., 35-60 wt. % of a tackifier, 0.1-10 wt. % of additive and 5-35 wt. % of a partially hydrogenated styrenic block copolymer. The partially hydrogenated styrenic block copolymer copolymer is obtained by hydrogenation of a styrenic block copolymer (SBC) comprising at least one polymer block A derived from a monoalkenyl arene monomer and at least one polymer block B derived from a conjugated diene monomer, the polymer block B has a hydrogenation level of less than 97 mol. %, based on the total mol of the polymerized conjugated diene monomer in the polymer block B. The partially hydrogenated styrenic block copolymer has a residual unsaturation (RU) of less than 20 meq/g. The adhesive composition has a 180° peel adhesion value of 12-0.1 N/25 mm and an odor score of less than 2. The adhesive composition is oil free.

In the second aspect, the adhesive composition has a weight ratio of partially hydrogenated styrenic block copolymer to amorphous polyolefin in the range of 1:5 to 3:2.

In the third aspect, the amorphous polyolefin is selected from the group consisting of, polyethylene (PE), polypropylene (PP), polybutylene (PB), propylene homopolymer, propylene-ethylene copolymer, copolymers of propylene-1-butene, higher α-olefins, ethylene, propylene terpolymer, 1-butene, ethylene-propylene rubber, polyolefin elastomer (POE), and mixtures thereof.

In the fourth aspect, the adhesive composition can be used in any of, diaper, napkin core stabilization, diaper back sheet lamination, industrial filter material conversion, surgical gown, and surgical drape assembly applications.

DESCRIPTION

The following terms will be used throughout the specification.

"At least one of [a group such as A, B, and C]" or "any of [a group such as A, B, and C]" means a single member from the group, more than one member from the group, or a combination of members from the group. For example, at least one of A, B, and C includes, for example, A only, B only, or C only, as well as A and B, A and C, B and C; or A, B, and C, or any other all combinations of A, B, and C.

A list of embodiments presented as "A, B, or C" is to be interpreted as including the embodiments, A only, B only, C only, "A or B," "A or C," "B or C," or "A, B, or C".

"Selected from $X_1, X_2, X_3, \ldots, X_n$, and mixtures thereof" means a single member of the group or more than a member of the group, e.g., $X_1, X_2, X_3, \ldots X_n$, or some, or all members of the group $X_1$-$X_2$ being present.

"Block" as used herein refers to a section of a polymer molecule that comprises a plurality of identical constitutional units (monomers) and possesses at least one constitutional or configurative feature that does not appear in the immediately adjacent sections (blocks).

"Copolymer" refers to a polymer derived from more than one species of monomer.

"Block copolymer" refers to a copolymer that comprises more than one species of monomer, wherein the monomers are present in blocks. Each block is constituted of a set of monomer units different from the set of monomers of the connected surrounding blocks in the same block copolymer. Each block can be constituted of a homopolymer or a random copolymer.

"Polystyrene content" or PSC of a block copolymer refers to the weight % of vinyl aromatic, e.g., styrene in the block copolymer, calculated by dividing the sum of molecular weight of all vinyl aromatic units by the total molecular weight of the block copolymer. PSC can be determined using any suitable methodology such as proton nuclear magnetic resonance (NMR).

"Vinyl content" refers to the content of a conjugated diene that is polymerized via 1,2-addition in the case of butadiene, or via 3,4-addition in case of isoprene, resulting in a mono-substituted olefin, or vinyl group, adjacent to the polymer backbone. Vinyl content can be measured by nuclear magnetic resonance spectrometry (NMR).

"Molecular weight" or $M_w$ refers to the polystyrene equivalent molecular weight in kg/mol of a polymer block or a block copolymer. $M_w$ can be measured with gel permeation chromatography (GPC) using polystyrene calibration standards, such as is done according to ASTM 5296-19. The GPC detector can be an ultraviolet or refractive index detector or a combination thereof. The chromatograph is calibrated using commercially available polystyrene molecular weight standards. $M_w$ of polymers measured using GPC are polystyrene equivalent molecular weights or apparent molecular weights, measured at the peak of the GPC trace, and commonly referred to as polystyrene equivalent "peak molecular weights," designated as $M_p$. Individual GPC block $M_w$ can be calculated by the difference of $M_p$ measured before and after the considered block polymerization. For example, $M_w$ of block B is the $M_p$ of species A-B minus the $M_p$ of block A.

"Residual Unsaturation (RU)" refers to the levels of unsaturation, i.e., carbon-carbon double bonds per gram of block copolymer. RU is measured using nuclear magnetic resonance or ozonolysis titration.

"Hydrogenation level" (H2%) refers to the level of saturation of the olefinic double bonds into the block copolymer. It can be calculated using the following equation when producing the p-HSBC: H2%=100*(RU before hydrogenation−RU after hydrogenation)/RU before hydrogenation.

"p-HSBC" refers to a partially hydrogenated styrenic block copolymer. The partially hydrogenated styrenic block copolymer is based on blocks of conjugated diene and styrenic monomers in which fraction of the double bonds resulting from the conjugated diene units have been reduced or hydrogenated, with "partially" meaning the conjugated bond partially (e.g., >20%, or <70%, or <80%, or <97%) hydrogenated. The level of hydrogenation in hydrogenated vinyl aromatic polymers can be determined using UV-VIS spectrophotometry and/or proton NMR. The hydrogenation level in hydrogenated diene polymers can be determined using proton NMR.

"Amorphous" refers herein to the substantial absence of crystallinity, in particular to polymers having an enthalpy of fusion of less than 20 J/g, as measured according to ISO 11357-2 (2013).

"Oil free" composition refers to a composition where oil is not intentionally added (or absent), having 0-15, or 0.5-13, or 1-10, or <8, or <5, or <1 wt. % mineral oil present.

"Odor" herein described by its intensity and its character. Intensity is defined as the overall strength of the smell (e.g., strong, moderate, weak or slight, etc.). Character is defined as the perceived description of the of the smell (e.g., clean, lavender, no scent, etc.). Odor can be characterized by an odor score: no odor=a score of 1; a slight but detectable odor=a score of 2; some odor but not strong=a score of 3 strong odor=a score of 4; pungent odor=a score of 5. The odor score can be obtained from an Odor Panel Testing with at least 5 testers trained in olfactory awareness, sniffing techniques, standardized descriptors, and olfactometry responses.

The disclosure relates to a hot-melt oil-free adhesive composition comprising, consisting essentially of, or consisting of, a partially hydrogenated styrenic block copolymer (p-HSBC) and an amorphous polyolefin(APO). The composition can be used to bond layers in articles, and with better mechanical and adhesive performance than polyolefin-only based adhesives, meeting hot-melt viscosity targets for applications with spray equipment.

Partially Hydrogenated Styrenic Block Copolymer (p-HSBC): The p-HSBC containing ethylenic unsaturation can be prepared by copolymerizing one or more olefins, including at least one conjugated diene, by themselves or with one or more alkenyl aromatic hydrocarbon monomers. The copolymers may or may not be tapered, the individual blocks may be homopolymers or random copolymers, and the polymer molecule may be linear or branched.

In embodiments, the copolymers have a general configuration selected from: A-B-A, (A-B-A)nX, (A-B)nX, A-C-A, (A-C-A)nX, (A-C)nX, A-B-C-A, (A-B-C-A)nX, and (A-B-C)nX, wherein X is the residual of a coupling agent, and "n" refers to the number of "arms" or "branches" in each of the structure. Each radial block copolymer has a varying number of arms or branches, but typically between 2 and 25, and preferably between 2 and 7. Prior to hydrogenation, each A block is monoalkenyl arene block, each B block is at least one conjugated diene, and each C block is a copolymer block of at least one conjugated diene and at least one monoalkenyl arene.

In embodiments, the copolymer block C is distribution controlled, meaning the polymerization is controlled to result in certain characteristics of the two monomers (herein termed a "controlled distribution" polymerization, i.e., a polymerization resulting in a "controlled distribution" structure), and also results in the presence of certain mono alkenyl arene rich regions and certain conjugated diene rich regions in the polymer block. "Controlled distribution" is defined as referring to a molecular structure having the following attributes: (1) terminal regions adjacent to the mono alkenyl arene homopolymer ("A") blocks that are rich in (i.e., having a greater than average amount of) conjugated diene units; (2) one or more regions not adjacent to the A blocks that are rich in (i.e., having a greater than average number of) mono alkenyl arene units and (3) an overall structure having relatively low blockiness. "Rich in" is defined as greater than the average amount, preferably greater than 5% of the average amount. This relatively low blockiness for the controlled distribution block can be shown by either the presence of only a single glass transition temperature (Tg), or an intermediate or median Tg between the Tg's of either the monomers when analyzed using differential scanning calorimetry ("DSC") thermal method or via a mechanical method, or as shown via a proton nuclear magnetic resonance ("H-NMR") method. The potential for blockiness can also be inferred from measurement of the UV-visible absorbance in a wavelength range suitable for the detection of polystyryllithium end groups during the polymerization of the B block. A sharp and substantial increase in this value is indicative of a substantial increase in polystyryllithium chain ends. In this process, this will only occur if the conjugated diene concentration drops below the critical level to maintain controlled distribution polymerization.

In embodiments, the partially hydrogenated block copolymer (p-HSBC) has, prior to hydrogenation, at least one monovinyl arene polymer block and at least one polybutadiene block or polyisoprene block. In embodiments, the polybutadiene block has between 8 and 80% 1,2-structure, and the remaining block is 1,4-structured and polyisoprene block has between about 8-40% 1,2-structure or 3,4-structure and 60-92% of 1,4-structure, as measured using infrared absorbance. The block copolymer is selectively hydrogenated to remove substantially all unsaturation in the pendant vinyl groups and from 0-50% of the unsaturation in the 1,4-structured portions of the block copolymer.

In embodiments, after partial hydrogenation, the copolymers have a general configuration selected from: S-BB-S, $(S\text{-}BB)_nX$, S-I/EP-S, and $(S\text{-}I/EP)_nX$, with n=2-7 and X is the residual of a coupling agent. Each S block is a monoalkenyl arene block. BB is butadiene (conjugated diene)-butylene block, IP is isoprene (conjugated diene)-propylene block.

The block copolymer is partially selectively hydrogenated, meaning the hydrogenated conjugated diene has a hydrogenation level of 20-97%, or >20%, or 30-95%, or >40%, or <70%, or <80%, or <97%.

The block copolymer, which is selectively partially hydrogenated, contains residual aliphatic double bonds in the polymer. In embodiments, the partially hydrogenated conjugated diene has a residual unsaturation or RU of <20 meq/g, or <15 meq/g, or <10 meq/g, or <8 meq/g, or >3 meq/g, or <5 meq/g, or 2-15 meq/g, or >0.5 meq/g.

In embodiments, each polymer block (S) has a molecular weight of 5-20 kg/mol, or 9-12 kg/mol, or at least 9.0 kg/mol, or at least 8.5 kg/mol, or at least 5.0 kg/mol, for each of the polymer block (s).

In embodiments, the p-HSBC has an average 1,2-vinyl content of 8-80%, or 15-75%, or 25-60 wt. % 35-50%, or >35%, or <75%, the vinyl content can be measured before hydrogenation, via proton NMR.

In embodiments, total polystyrene content (PSC) prior to hydrogenation is >20%, or 25-40%, or >18%, or <45%.

In embodiments, the p-HSBC has a Mw or $M_p$ of 50-500 kg/mol, or 60-400 kg/mol, or 75-250 kg/mol, or <400 kg/mol or <300 kg/mol or <200 kg/mol.

In embodiments, the p-HSBC is present in an amount of 2-50 wt. %, or 5-40 wt. %, or 8-35 wt. %, or 15-35 wt. %, or 15-25 wt. % based on the total weight of the adhesive composition.

Amorphous Poly Olefin (APO): The adhesive composition further comprises an amorphous polyolefin or a mixture of APOs thereof. The amorphous polyolefin is selected from the group consisting of: polyethylene (PE), polypropylene (PP), polybutylene (PB), homopolymers of propylene, copolymers of propylene and ethylene, copolymers of propylene and 1-butene or other higher a-olefins, terpolymers of ethylene, propylene, and 1-butene, ethylene-propylene rubber i.e., ethylene propylene diene monomer), polyolefin elastomer (POE), and mixtures thereof.

In embodiments, the amorphous polyolefin has a density of <0.86 g/cm$^3$, or <0.87 g/cm$^3$, or <0.88 g/cm$^3$, or <0.89 g/cm$^3$, <0.90 g/cm$^3$, or <1 g/cm$^3$ according to ISO 1183 and a softening point of 10-120° C., or <120° C., or <110° C., or <100° C., or <90° C., or <80° C., or <70° C. as per ASTM D3104.

In embodiments, the amorphous polyolefin comprises or consists of at least one propylene-based polymer (PbP). PbP refers to linear propylene homopolymers or copolymers produced using Ziegler or metallocene catalysts. PbP typically has a propylene content of at least 50% by weight or more. Amorphous polyolefins such as propylene-based polymers (PbP) can function as a base polymer, and also can function as a plasticizer and/or a tackifier in the formulation. In embodiments, PbP has a density of <0.86 g/cm$^3$, or <0.87 g/cm$^3$, or <0.88 g/cm$^3$, or <0.89 g/cm$^3$, or <0.90 g/cm$^3$, or <1 g/cm$^3$ according to ISO 1183 and a softening point of 10-120° C., or <120° C., or <110° C., or <100° C., or <90° C., or <80° C., or <70° C. or, <60° C., or <50° C., as per ASTM D3104.

In embodiments, the amorphous polyolefin is present in an amount of 5-60 wt. %, or 10-50 wt. %, or 15-40 wt. %, or 20-40 wt. % by weight of the adhesive composition.

In embodiments, the weight ratio between the p-HSBC and the amorphous polyolefin is in the range of 1:8 to 5:2, or 1:5 to 3:2, or 8:1 to 2:5, or 4:1 to 2:5, or 2:1 to 1:1.

In embodiments, the amorphous polyolefin has a glass transition temperature of <−25° C., or <−35° C., or <−40° C., or <−45° C., or <−50° C., as determined by the DSC method according to DIN 11357-2.

Tackifiers: The adhesive composition further comprises tackifiers, which can be hydrogenated or partially hydrogenated. In embodiments, a partially hydrogenated tackifier serves as a compatibilizer instead of mineral oil. A partially hydrogenated tackifier can help the blending of the adhesive components. A partially hydrogenated tackifier can also help homogenize the blend of p-HSBC and the amorphous polyolefin and provides adhesion at an acceptable moderate level.

Examples of useful tackifiers include, e.g., aliphatic and cycloaliphatic hydrocarbon resins, mixed aromatic and aliphatic modified hydrocarbon resins, aromatic modified aliphatic hydrocarbon resins, and aromatic modified aliphatic hydrocarbon resins (partially) hydrogenated version, partially or fully hydrogenated hydrocarbon resins, terpenes, modified terpenes, hydrogenated terpenes version and combinations thereof, modified rosin esters and copolymers and terpolymers of natural terpenes (e.g., styrene-terpene, alpha-methyl styrene-terpene, and vinyl toluene-terpene), phenolic-modified terpene resins and combinations thereof.

In embodiments, tackifier is present in an amount of 20 to 60 wt. %, or 25 to 55 wt. %, or 30 to 50 wt. %, or 25 to 45 wt. % by the total weight of the adhesive composition.

Optional Additives: The hot melt adhesive composition optionally includes additional components including, e.g., antioxidants, adhesion promoters, ultraviolet light stabilizers, rheology modifiers, biocides, corrosion inhibitors, dehydrators, colorants (e.g., pigments and dyes), fillers, surfactants, flame retardants, and combinations thereof.

In embodiments, antioxidants are selected from but not limited to, e.g., pentaerythritol tetrakis[3,(3,5-di-tert-butyl-4-hydroxyphenyl)propionate], 2,2'-methylene bis(4-methyl-6-tert-butylphenol), phosphites including, e.g., tris-nonylphenyl)-phosphite (TNPP) and bis(2,4-di-tert-butylphenyl)4,4'-diphenylene-diphosphonite, di-stearyl-3,3'-thiodipropionate (DSTDP), Butylated hydroxytoluene (BHT), butylated hydroxyanisole (BHA), tertiary-butylhydroquinone (TBHQ) and combinations thereof.

In embodiments, additives are present in an amount of 0-15, or 0.5-15, or 0.1-12, or 1-10, or 2-8, or >1, or >2, or <5 wt. %, based on the total weight of the adhesive composition.

Method of Forming Adhesive Composition: The hot-melt adhesive composition is formed by mixing p-HSBC with amorphous polyolefin (e.g., propylene-based polymer), and any other ingredients, using methods known in the art, e.g., using a co-rotating twin-screw extruder at processing temperature between 180° C. and 250° C. or batch type mixers such as Z-blade mixers, with processing temperatures between 160° C. and 200° C.

In embodiments, the adhesive composition comprises 15-35 wt. % of p-HSBC, 20-60 wt. % tackifying resin, 20-50 wt. % of amorphous poly olefin, and 0-15 wt. % additives, based on the total weight of the adhesive composition.

The adhesive composition comprises a low amount of a mineral oil ranging from 0-15, or 0.5-15, or 1-12, or <10, or <5, or <1 wt. %, based on the total weight of the adhesive composition, or essentially oil free (oil is not intentionally added). In embodiments, the adhesive composition is prepared in the absence of the mineral oil.

Properties of Hot-melt Adhesive Composition: The adhesive composition is characterized as having improved mechanical and thermal properties suitable for use in high-performance applications. The adhesive has one or more or all of the following properties:

Melt viscosity of between 200-7500 cP, or >300 cP, or >800 cP, or between 1500-2200 cP, or >4200 cP, or <5000 cP, measured in accordance with DIN 53019 at 160° C.

Tensile strength of at least 2 MPa, or <5 MPa, or 4.2 MPa, or 3 MPa, or <3 MPa, or 1.9 MPa, measured in accordance with ISO 527.

Elongation at break of more than 1000%, or 980%, or 900%, or 880%, or 750% measured in accordance with ISO 527.

Peel adhesion (N/25 mm) of 12-0.1, or <10, or <9, or <8, or <5, or <3, or <2.2 or <1.8, or <0.5, or <0.2 N/25 mm, as determined under the 180° peel adhesion test, performed according to FTM-1 (300 mm/min) against HDPE substrate.

Softening points of 40 to 160° C., or <150° C., or <135° C., or <120° C., or >105° C., or >100° C., or >98° C., or >75° C. as determined by a ring and ball test according to ASTM method E28.

The adhesive composition is characterized as having a slight (weak) or negligent odor, with an odor score of <2, or <1.75, or <1.5, or <1.

Applications: The adhesive composition can be used in applications including disposable nonwoven hygienic articles, paper converting, flexible packaging, woodworking, carton, case sealing, and other assembly applications. The adhesive composition is also useful in a variety of processes used to bond a first substrate to a second substrate in lamination processes, e.g., laminating porous substrates to polymer films, porous substrates to porous substrates, polymer films to polymer films, and combinations thereof. In embodiments, the adhesive composition is used in disposable diapers and feminine sanitary napkin construction, diaper, and adult incontinent brief elastic attachment, diaper and napkin core stabilization, diaper back sheet lamination, industrial filter material conversion, surgical gown, surgical drape assembly, etc.

Examples: The following illustrative examples are intended to be non-limiting.

The following test methods are used.

Polymer molecular weights can be determined by gel permeation chromatography (GPC) using polystyrene calibration standards according to ASTM 5296.

Tensile stress strain is measured according to ISO37.

Melt flow rates (MFR) are measured according to D1238.

The components used in examples include:

Tackifier is a partially hydrogenated C5/C9 hydrocarbon resin (mixed aliphatic/aromatic resins) with glass transition temperature of 49° C. and softening point of 102° C.

Antioxidant (AO)—a sterically hindered phenolic primary antioxidant.

Amorphous polyolefin-1 (APO-1) is a metallocene-technology based C3-C2 copolymer with a glass transition temperature of −44° C. and target viscosity of 100-300 mPa·s at 170° C.

Amorphous polyolefin-2 (APO-2)—is a metallocene-technology based C3-C2 copolymer wax, with drop point of 87-93° C., target viscosity of 150 mPas-250 mPas at 170° C., and density of 0.86-0.88 g/cm$^3$.

In the examples, the precursor for the partially hydrogenated polymer is a linear triblock polymer of the type styrene-butadiene-styrene (A-B-A), having a molecular weight (MW) of 100-200 kg/mol.

The precursors SBC 1-3 are made into fully and partially hydrogenated styrenic block copolymers, HSBC-1 (comparative), p-HSBC-2, p-HSBC-3, at different PSC content (polystyrene), residual unsaturation (RU) levels, and MFR, as provided in Table 1.

TABLE 1

| Polymer | Structure | RU (meq/g) | Total MW (kg/mol) | Vinyl content % | PSC % | MFR g/10 min | MFR conditions |
|---|---|---|---|---|---|---|---|
| HSBC-1 (comparative) | SEBS | <1 | 83 | 78% | 20 | 30-46 | 190° C./2.16 Kg |
| p-HSBC-2 | SBBS | 2.1 | 120 | 37 | 20 | 10 | 230° C./2.16 Kg |
| p-HSBC-3 | SBBS | 4.0 | 110 | 24 | 30 | 4 | 230° C./5 Kg |

Adhesive Formulation Examples 1-5: The hot-melt adhesive is made by mixing the ingredients as shown in Table 2 below. The formulations of the examples were mixed with a Z-blade at a set oil bath temperature of 180° C.

TABLE 2

| Examples (Exam) | Exam 1* comp | Exam 2* | Exam 3* | Exam 4* comp | Exam 5* comp |
|---|---|---|---|---|---|
| APO-1 | 30 | 30 | 30 | 50 | — |
| APO-2 | — | — | — | — | 50 |
| HSBC-1 | 20 | — | — | — | — |
| p-HSBC-2 | — | 20 | — | — | — |
| p-HSBC-3 | — | — | 20 | — | — |
| Tackifier | 49 | 49 | 49 | 49 | 49 |
| Antioxidant | 1 | 1 | 1 | 1 | 1 |

*Formulations- Exam 1-4 solvent coated on PET with a coat weight of 22 gsm.

Table 3 below shows the properties of examples 1-5.

TABLE 3

| Examples | HMV @ 160° C. (cP) | Tensile Strength (MPa) | Elongation at break (%) | Softening Point ° C. |
|---|---|---|---|---|
| 1 (comp) | 1633 | 1.9 | 590 | 98.5 |
| 2 | 2143 | 3 | 980 | 101.5 |
| 3 | 4188 | 2.9 | 900 | 120.3 |
| 4 (comp) | 210 | not measurable | not measurable | not measurable |
| 5 (comp) | 330 | not measurable | not measurable | 75.6 |

Adhesion Properties: 180° peel adhesion (angle) and holding power (static shear) tests conducted on HDPE as shown in Table 4 below.

TABLE 4

| Examples | Peel Adhesion on HDPE (N/25 mm) | Holding Power on HDPE (min) |
|---|---|---|
| 30% APO-1 + p-HSBC-2 | 1.8 | 132.4 |
| 30% APO-1 + p-HSBC-3 | 0.5 | 0.4 |
| 50% APO-1 | 0 | 0 |
| 50% APO-2 | 0 | 0 |

Odor scores of the adhesive composition in Examples 1-5) are reported as shown in Table 5. The samples are placed in a closed jar at 80° C. for 1 hrs., cooled to room temperature (RT) before sniffing by a test panel at a distance of 5 cm from the jar. After 2 rounds of sniffing, the jar is closed and heated again to 80° C. for 1 hr., cooled to RT before sniffing again by the panel members at same distance from the jar.

TABLE 5

| | Example 1 | Example 2 | Example 3 | Example 4 | Example 5 |
|---|---|---|---|---|---|
| Average Odor Score | 1.6 | 1.8 | 1.7 | 1.6 | 1.7 |

As used herein, the term "comprising" means including elements or steps that are identified following that term, but any such elements or steps are not exhaustive, and an embodiment can include other elements or steps. Although the terms "comprising" and "including" have been used herein to describe various aspects, the terms "consisting essentially of" and "consisting of" can be used in place of "comprising" and "including" to provide for more specific aspects of the disclosure and are also disclosed.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items.

Unless otherwise specified, all technical and scientific terms used herein have the same meanings as commonly understood by one of skill in the art to which the disclosed disclosure belongs. the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

The invention claimed is:

1. An adhesive composition comprising:

20 to 40 wt. % of an amorphous polyolefin having a density of less than 1 g/cm$^3$ and a glass transition temperature of less than −50° C., determined by DIN 11357-2;

35 to 60 wt. % of a tackifier;

0.1 to 10 wt. % of at least an additive; and 5 to 35 wt. % of a partially hydrogenated styrenic block copolymer;

wherein the partially hydrogenated styrenic block copolymer is obtained by hydrogenation of a styrenic block copolymer comprising at least one polymer block A derived from a monoalkenyl arene monomer and at least one polymer block B derived from a conjugated diene monomer, the polymer block B has a hydrogenation level, as determined by proton NMR spectroscopy, of less than 97 mol %, based on the total mol of the polymerized conjugated diene monomer in the polymer block B; and wherein the partially hydrogenated styrenic block copolymer has a residual unsaturation (RU) of less than 20 meq/g, as determined by proton NMR spectroscopy;

wherein the adhesive composition has a 180° peel adhesion value of 12-0.1 N/25 mm, as determined according to FTM-1, and an odor score of less than 2, as determined by Odor Panel Testing; and wherein the adhesive composition is oil free.

2. The adhesive composition of claim 1, wherein weight ratio of partially hydrogenated styrenic block copolymer to amorphous polyolefin is in the range of 1:5 to 3:2.

3. The adhesive composition of claim 1, wherein the amorphous polyolefin is selected from the group consisting of: polyethylene (PE), polypropylene (PP), polybutylene (PB), propylene homopolymer, propylene-ethylene copolymer, copolymers of propylene-1-butene, higher α-olefins, ethylene, propylene terpolymer, 1-butene, ethylene-propylene rubber, polyolefin elastomer (POE), and mixtures thereof.

4. The adhesive composition of claim 3, wherein the amorphous polyolefin has a softening point of 10-120° C. as per ASTM D3104.

5. The adhesive composition of claim 1, wherein the partially hydrogenated styrenic block copolymer has a general configuration of: A-B-A, (A-B-A)nX, (A-B)nX, A-C-A, (A-C-A)nX, (A-C)nX, A-B-C-A, or (A-B-C-A)nX, and wherein prior to partial hydrogenation;

each A block is derived from a monoalkenyl arene;

each B block is derived from a conjugated diene;

each C block is a copolymer block derived from at least one conjugated diene and at least one monoalkenyl arene;

x is residual of a coupling agent, and n=2 to 7.

6. The adhesive composition of claim 5, wherein the block B is derived from any of butadiene, isoprene, or mixtures thereof.

7. The adhesive composition of claim 6, wherein the block B is derived from butadiene, wherein the polymerized butadiene block has 8 to 80% of a 1,2-structure and 20 to 92% of a 1,4-structure, as measured using proton NMR spectroscopy;

wherein the 1,2-structure is selectively hydrogenated to remove all residual unsaturation, and the vinyl groups in 1,4-structure is selectively hydrogenated to remove less than 50% of residual unsaturation.

8. The adhesive composition of claim 6, wherein the block B is derived from isoprene, wherein the polymerized isoprene block has 8 to 40% of a 1,2-structure or a 3,4-structure and 60 to 92% of 1,4-structure, as measured using proton NMR spectroscopy;

wherein the 1,2-structure is selectively hydrogenated to remove all residual unsaturation, and the vinyl groups in 1,4-structure is selectively hydrogenated to remove less than 50% of residual unsaturation.

9. The adhesive composition of claim 5, wherein the block A is derived from the group consisting of polymerized unsubstituted styrene, para-substituted styrene, ortho-substituted styrene, meta-substituted styrene, alpha-methylstyrene, 1,1-diphenylethylene, 1,2-diphenylethylene, and mixtures thereof.

10. The adhesive composition of claim 1, wherein the partially hydrogenated styrenic block copolymer has a general configuration selected from: S-BB-S, $(S\text{-}BB)_nX$, S-I/EP-S, $(S\text{-}I/EP)_nX$ and mixtures thereof;

wherein:

n=2-7 and X is the residual of a coupling agent;

each S block is a monoalkenyl arene block;

each BB block is a butadiene-butylene block; and each I/EP block is an isoprene/ethylene-propylene block.

11. The adhesive composition of claim 1, wherein the partially hydrogenated styrenic block copolymer has a peak molecular weight $M_p$ of 75 to 250 kg/mol.

12. The adhesive composition of claim 1, wherein the partially hydrogenated styrenic block copolymer has a residual unsaturation (RU) of 2 to 15 meq/g, as determined by proton NMR spectroscopy.

13. The adhesive composition of claim 1, wherein the partially hydrogenated styrenic block copolymer has a polystyrene content (PSC) of <45%.

14. The adhesive composition of claim 1, wherein the partially hydrogenated styrenic block copolymer has a vinyl content of 15-75%.

15. The adhesive composition of claim 1, wherein the adhesive composition has a viscosity of less than 10,000 cP at 160° C. measured in accordance with DIN 53019 at 160° C.

16. The adhesive composition of claim 1, wherein the adhesive composition has an elongation at break of greater than 750%, measured in accordance with ISO 527.

17. The adhesive composition of claim 1, wherein the adhesive composition has 180° peel adhesion value of 5-0.1 N/25 mm, as determined according to FTM-1.

18. The adhesive composition of claim 1, wherein the adhesive composition has a softening point of 70° C. to 150° C., according to Ring and Ball method (DIN test 52011).

19. The adhesive composition of claim 1, wherein the adhesive composition is prepared in the absence of mineral oil.

20. The adhesive composition of claim 1, wherein the tackifier is selected from the group consisting of: aliphatic and cycloaliphatic hydrocarbon resins, mixed aromatic and aliphatic modified hydrocarbon resins, aromatic modified aliphatic hydrocarbon resins, partially hydrogenated aromatic modified aliphatic hydrocarbon resins, partially or fully hydrogenated hydrocarbon resins, terpenes, modified terpenes, hydrogenated terpenes, modified rosin ester, styrene-terpene, alpha-methyl styrene-terpene, vinyl toluene-terpene, phenolic-modified terpene resin and combinations thereof.

21. The adhesive composition of claim 1, for use in any of: diaper, napkin core stabilization, diaper back sheet lamination, industrial filter material conversion, surgical gown, and surgical drape assembly applications.

* * * * *